United States Patent

Kawai et al.

[15] 3,686,583

[45] Aug. 22, 1972

[54] SIGNAL GENERATOR FOR A FLASHER TYPE DIRECTION INDICATOR

[72] Inventors: Hisasi Kawai, Toyohashi; Masami Amaki, Okazaki, both of Japan

[73] Assignee: Nippondenso Kabushiki Kaisha, Kariya-shi, Aichi-ken, Japan

[22] Filed: Jan. 5, 1971

[21] Appl. No.: 104,051

[30] Foreign Application Priority Data

Feb. 13, 1970 Japan ......................45/12945
Feb. 13, 1970 Japan ......................45/12946

[52] U.S. Cl...................331/57, 307/215, 315/200 A, 331/60, 331/108 D, 331/135, 340/81 R, 340/82

[51] Int. Cl. ........B60q 1/34, H03k 3/28, H05b 41/34

[58] Field of Search......331/57, 60, 108 D, 111, 135, 331/136; 315/200 A; 340/81 R, 82; 307/215

[56] References Cited

UNITED STATES PATENTS

| | | | |
|---|---|---|---|
| 3,395,362 | 7/1968 | Sutherland | 331/57 |
| 3,428,913 | 2/1969 | Pechoucek | 331/57 |
| 3,474,410 | 10/1969 | Ivec | 340/82 |
| 3,548,372 | 12/1970 | Yohezu | 340/82 |

*Primary Examiner*—Roy Lake
*Assistant Examiner*—Siegfried H. Grimm
*Attorney*—Cushman, Darby & Cushman

[57] ABSTRACT

There has been provided a signal generator for a flasher type direction indicator including first and second integrator circuits, each associated with first and second logical circuits. Inputs and outputs of each of the respective circuits are coupled to their associated logical circuits so that each produces an output when the input and output of each of their associated integrating circuits are both activated. Further the output of each logical circuit is coupled to the common inputs of the other integrating and logical circuits so that the indicator is flashed on and off by the output signals of the second logical circuit.

There has further been provided third and fourth integrating circuits with respectively associated first and second inverter circuits for inverting the outputs of their associated integrated circuits with a reversal of phase. The output of the second logical circuit is coupled to the common input of the first integrator and associated logical circuit at the input of the third integrator, while the output of the first inverter is coupled to the input of the fourth integrator so that three indicators are flashed on and off at different recurrent rates in accordance with the output of the second logical circuit and the first and second inverter circuits.

8 Claims, 19 Drawing Figures

Patented Aug. 22, 1972 3,686,583

2 Sheets-Sheet 1

INVENTORS

Hisaei Kawai

Masami Imaki

BY Cushman, Darby & Cushman

ATTORNEYS

INVENTORS
Hisaai Kawai
Masami Imaki
BY Cushman, Darby & Cushman
ATTORNEYS

SIGNAL GENERATOR FOR A FLASHER TYPE DIRECTION INDICATOR

BACKGROUND OF THE INVENTION

1. Field of the Invention

The present invention has particular relation to improvements in and relating to signal generators for flasher type direction indicators of the type in which the turn signal lamps are flashed on and off at specified periods to indicate the direction of turn.

Description of the Prior Art

In the past, the direction indicators used on automotive vehicles have been so designed that of the turn signal lamps mounted at the front and the rear of the vehicle on both sides thereof, depending on the direction of a turn which is about to be made, the front and rear lamps on the one or the other side of the vehicle are caused to go on and off intermittently to indicate or signal the direction of the turn.

Moreover, with the increasing acceptance of the automotive vehicles by the public, the number of automobiles travelling along roads as well as the road speeds have been ever increasing. Accordingly, there has been the need to design so that turn signal lamps could be more clearly perceived from a distance with the result that attempts have been made to make the lamps used larger and to employ a plurality of light sources instead of a single source. Particularly, a flasher type direction indicator of the type in which a plurality of light sources in each of the turn signal lamps are sequentially lighted, has been said to be advantageous from the standpoint of more clearly indicating the direction of turns. According to an example of this type of direction indicators, a turn signal lamp having three light sources is provided on the left and right rear of the vehicle respectively so that when making a left turn, for example, the light source in the left turn signal lamp which is nearest to the center of the rear of the vehicle is lit first, followed by the lighting of the second light source and then the third and outermost light source is turned on, thereupon all the light sources are simultaneously turned off. Repetitions of this process indicate the left turn. In this manner, the lighting of the light sources in the left or right turn signal lamp may be moved progressively in the direction of a left or right turn and this process may be repeated upon simultaneous extinction of all the light sources so that the driver of the following vehicle can very clearly perceive the direction of the turn which is about to be made by the preceding vehicle.

A conventional method used with the direction indicators of the type described above has employed a rectangular wave oscillator incorporating a monostable multivibrator circuit for generating rectangular wave signals which may be used for lighting and extinguishing the lamps in the direction indicator. However, this method has a drawback in that a misoperation of the indicator may be caused by the rectangular wave oscillator due to a noise produced b the engine ignition the system.

On the other hand, flashing methods have hitherto been used with the sequential lighting type direction indicators in which the sequential lighting operation of the light sources in the turn signal lamps is effected by reducing the rotational speed of a motor through a speed reducing gear so as to rotate a cam which in turn closes and opens the contacts sequentially or alternately a plurality of flashing relays each thereof incorporating a hot-wire are used in combination to sequentially close and open the contacts. However, these methods are also disadvantageous in that not only a great number of contacts are needed for each of the direction indicators, but also the indicators are not fully reliable in terms of the durability of the contacts and their size also tends to become larger.

In order to solve these deficiencies, as disclosed in Japanese Pat. Publication No. 17030/1968, a signal generator has been proposed wherein the output of a free-running or astable multivibrator is used as an input signal to a flip-flop circuit so that all of the three different signals representing the logical product and the logical sum of the two output signals derived from the two circuits and the output signal of the flip-flop circuit, respectively, are utilized to sequentially light the three light sources within a turn signal lamp, or differently two monostable multivibrators are driven by an astable multivibrator so that the logical operations are performed on the output signals from the three multivibrators to thereby sequentially light the three light sources within a turn signal lamp.

However, this signal generator has a defect in that since both of the multivibrators and the flip-flop circuit are operated by means of trigger pulses, misoperation of these circuits may be easily caused by such noise as induced from the power supply lead or the like. There is another drawback in that while the astable multivibrator is so designed that one of its transistors which is non-conducting may be turned into the conducting state when the terminal voltage of the capacitor charged through the base-emitter circuit of the other transistor in the conduction state becomes higher than the base cutoff voltage of the first mentioned transistor, the introduction of noise from the power supply lead or the like while this capacitor is being charged may give rise to a misoperation in that this noise will cause the first mentioned non-conducting transistor to turn into the conducting state in spite of the fact that the terminal voltage of the capacitor is still below the base cutoff voltage of the transistor. Particularly, there is a drawback in that when a signal generator comprising the aforesaid multivibrators, flip-flop circuit etc. is installed in a vehicle, the ignition noise produced by the ignition system of an internal combustion engine installed in the vehicle may lead to frequent misoperations of the signal generator. There is a still further drawback in that with the signal generator comprising the astable multivibrator, the monostable multivibrators and the flip-flop circuit, a misoperation may easily be caused the instant the power source switch is turned on with the resultant simultaneous lighting of all the light sources, thereby giving a feeling of uneasiness to the driver of the following vehicle.

On the other hand, semiconductor integrated circuits (hereinafter simply referred to as IC) have come into the limelight in recent years as in the case of electronic computers, and especially with automotive vehicles the use of various electrical control devices incorporating IC has been promoted for such purposes as the saving of space for mounting these devices. Accordingly, there has been a desire that a signal generator capable of readily incorporating IC is provided for the flasher type direction indicators described above.

SUMMARY OF THE INVENTION

A primary object of the present invention is to provide a signal generator for flasher type direction indicators which is capable of producing stable rectangular wave signals so that the lights may be flashed on and off in a stable manner by these rectangular wave signals.

Another object of the present invention is to provide a signal generator for sequential flashing type direction indicators which is capable of producing at the same periods a plurality of rectangular wave signals each thereof having a different time duration, so that the lights may be flashed on and off with these signals.

A further object of the present invention is to provide a signal generator for flasher type direction indicators as described above, which incorporates IC elements and hence is simple and compact in construction.

The signal generator according to the present invention comprises a first integrating circuit, a first logical circuit for producing an output signal when both of the input and output signals of the first integrating circuit are applied thereto, a second integrating circuit, and a second logical circuit for producing an output signal when both of the input and output signals of the second integrating circuit are applied thereto, the input terminal of the second integrating circuit and the input terminal of the second logical circuit having a common connection to the output terminal of the first logical circuit, and the input terminal of the first integrating circuit and the input terminal of the first logical circuit having a common connection to the output terminal of the second logical circuit, whereby the flashing of a flasher type direction indicator is effected with rectangular wave signals generated by the second logical circuit.

When the signal generator of the present invention is used with a sequential flashing type direction indicator, the output signal of the second logical circuit will be used as a first signal, a second signal will be provided by the first signal which is integrated by a third integrating circuit and is then applied to a first inverter circuit where both the shape and phase of the integrated signal are changed and a third signal will be provided by the second signal which, after being integrated by a fourth integrating signal, is applied to a second inverter circuit where both the shape and phase of the integrated second signal are changed, whereby the three light sources will be flashed on and off at the same periods, but with different flashing ratios. Thus, a signal generator for flasher type direction indicators can be provided, which is free from any mis-operation due to noise introduced from the power supply lead or the like and which can be constructed by readily assembling IC circuits available on the market.

The above and other objects, features and advantages of the present invention will be readily apparent from the following descriptions of the preferred embodiments taken in conjunction with the accompanying drawings.

DESCRIPTION OF THE PREFERRED EMBODIMENTS

Figure 1:
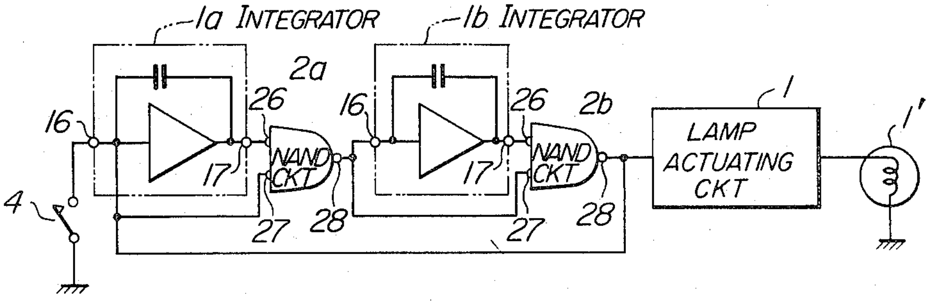
FIG. 1 is a block diagram showing the general construction of an embodiment of the present invention.

In FIG. 1 illustrating the circuit construction of an embodiment of the present invention, numerals 1*a* and 1*b* designate first and second integrating circuits which are identical with each other excepting that the capacitance values and the resistance values of the capacitors and resistors included in these circuits are different. Numerals 2*a* and 2*b* designate first and second NAND circuits each of which is provided with two input terminals, and numeral 1 designates a lamp actuating circuit and 1' designates one of the lamps mounted on both sides of the rear of the vehicle. An input terminal 16 and an output terminal 17 of the first integrating circuit 1a are connected respectively to input terminals 26 and 27 of the first NAND circuit 2*a* and an output terminal 28 of this NAND circuit 2*a* is connected to an input terminal 16 of the second integrating circuit 1*b* whose input terminal 16 and output terminal 17 are in turn connected to input terminals 26 and 27 of the second NAND circuit 2*b*. An output terminal 28 of this NAND circuit 2*b* is connected to the input terminal 16 of the integrating circuit 1*a*. The output terminal 28 of the second NAND circuit 2*b* is connected to the input terminal of the lamp actuating circuit 1 which is in turn connected to the lamp 1'. A switch 4 has one of its ends connected to the input terminal 16 of the first integrating circuit 1a and the other end grounded.

Figure 2:
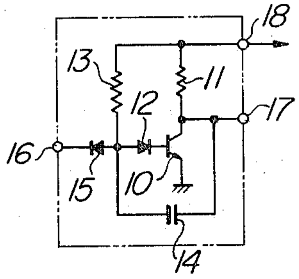
FIG. 2 is an electrical wiring diagram of an integrating circuit.

The first and second integrating circuits 1a and 1*b* have the circuit construction as shown in FIG. 2 in which numeral 10 designates a transistor whose emitter is grounded and its collector is also connected to a power supply terminal 18 through a resistor 11. The base of the transistor 10 is connected to the cathode of a diode 12 whose anode is respectively connected to one end of a resistor 13, one end of a capacitor 14 and the anode of a diode 15, while the other end of the resistor 13 is connected to the power supply terminal 18, the other end of the capacitor 14 to the collector of the transistor 10 and the cathode of the diode 15 to the input terminal 16. The collector of the transistor 10 is connected to the output terminal 17 and a voltage of 6 volts is applied to the power supply terminal 18 from a DC power source (not shown).

Figure 3:
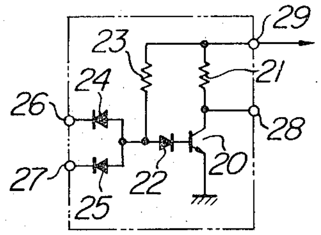
FIG. 3 is an electrical wiring diagram of a NAND circuit.

The circuit construction of the first and second NAND circuits 2*a* and 2*b* is as shown in FIG. 3 in which numeral 20 designates a transistor whose emitter is grounded and its collector is connected to a power supply terminal 29 by way of a resistor 21. The base of the transistor 20 is connected to the cathode of a diode 22 whose anode is respectively connected to one end of a resistor 23 and the anodes of diodes 24 and 25. The other end of the resistor 23 is connected to the power supply terminal 29, the cathode of the diode 24 to the one input terminal 26 and the cathode of the diode 25 to the other input terminal 27. The collector of the transistor 20 is connected to the output terminal 28 and a voltage of 6 volts is applied to the power supply terminal 29 from a DC power supply circuit which is not shown.

With the constructions described above, the operations of the first and second integrating circuits 1*a* and 1*b* and the first and second NAND circuits 2*a* and 2*b* will be explained. Firstly, the operation of the first and second integrating circuits 1*a* and 1*b* will be explained in general. With the switch 4 closed, the input terminal 16 is at zero potential so that the transistor 10 is cut off and the plate of the capacitor 14 on the diode 15 side is substantially at zero potential with the power supply voltage appearing across the collector of the transistor 10. The power supply voltage also appears at the output terminal 17.

Figure 4A:
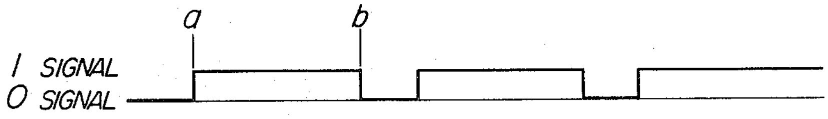
FIGS. 4*a*, 4*b*, 4*c*, 4*d* and 4*e* are diagrams showing the input and output waveforms generated at various points in the integrated circuits and the NAND circuits.
Figure 4B:
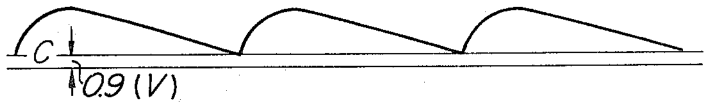

When the switch 4 is opened so that the voltage at the input terminal the integrating circuit changed from a low voltage (hereinafter referred to as the "0" signal) to a high voltage (hereinafter referred to as the "1" signal), a current flows through the resistor 13 and the diode 12 to the base of the transistor 10 to make the transistor 10 conduct. As the transistor 10 starts to conduct, the capacitor 14 starts to discharge by way of the collector and the emitter of the transistor 10 the charge stored on its plate connected to the collector of the transistor 10. When this happens, the plate of the capacitor 14 on the diode 15 side tends to become of negative potential thus receiving the current flowing through the resistor 13 to limit the base current of the transistor 10. In other words, an integrating action is performed. This process is shown in FIGS. 4*a* and 4*b* with FIG. 4*a* illustrating the voltage waveform of the input signal applied to the input terminal 16 and FIG. 4*b* illustrating the voltage waveform of the output signal produced at the output terminal 17. A point *a* in FIG. 4*a* represents the time at which the signal at the input terminal 16 has changed from "0" to "1" and the integration is initiated at this point so that it will be terminated at a point *b* where the signal will again change to "0". Then, as the signal at the input terminal 16 has changed from "1" to "0" at the point *b*, the capacitor 14 starts to charge through the resistor 11 and this charging continues until the output voltage reaches the power supply voltage so that the charging ends upon saturation.

Figure 4C:
Figure 4D:
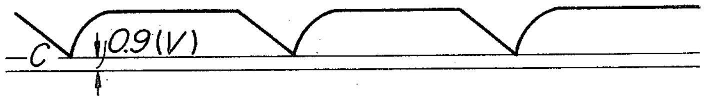
Figure 4E:
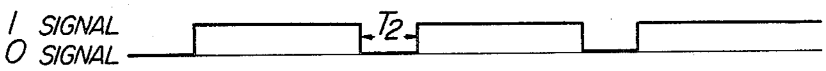

Next, the operation of the first and second NAND circuits 2*a* and 2*b* will be explained in general. When the input and output signals of the first or second integrating circuit are applied to the input terminals 26 and 27 of the first or second NAND circuit 2*a* or 2*b*, respectively, the first or second NAND circuit 2a or 2*b* produces at its output terminal 28 a "1" signal when both of the input levels at the input terminals 26 and 27 are within 0 to 0.9 volts and a "0" signal when at least any one of the input levels at the input terminals 26 and 27 is above 0.9 volts. Thus, the output waveforms developed at the output terminals 28 of the first and second NAND circuits 2*a* and 2*b* will take the forms shown in FIG. 4*c*. A point *c* on the ordinate in FIG. 4*b* represents the level of 0.9 volts. In other words, by arranging the first integrating circuit 1*a* and the first NAND circuit 2*a* or the second integrating circuit 1*b* and the second NAND circuit 2b as shown in FIG. 1, the output signal of the first or second NAND circuit changes from "1" to "0" when the input signal of the first or second integrating circuit changes from "0" to "1" and this "0" output signal reverts to "1" after the expiration of a definite time. This definite time will be determined by the capacity of the capacitor 14. As the output signal of the second NAND circuit 2*b* changes from "0" to "1", the first integrating circuit 1a and the first NAND circuit 2*a* cause the output signal of the first NAND circuit 2*a* to change from "1" to "0" as shown in FIG. 4*c*, so that the signal reverts to "1" after the expiration of a definite time $T_1$. Then, as the output signal of the first NAND circuit 2*a* changes from "0" to "1", the second integrating circuit 1*b* and the second NAND circuit 2*b* cause the output signal of the second NAND circuit 2*b* to change from "1" to "0" as shown in FIGS. 4*d* and 4*e*, so that the signal reverts to "1" at the expiration of a definite time $T_2$. In this manner, the rectangular waves as shown in FIGS. 4*c* and 4*e* can be obtained from the first NAND circuit 2*a* and the second NAND circuit 2*b*, respectively. Of course, the "1" state of the output of the second NAND circuit 2*b* corresponds to the time $T_1$ and the "0" state corresponds to the time $T_2$. The time $T_1$ will be determined by the capacity of the capacitor in the first integrating circuit 1*a* and the time $T_2$ by the capacity of the capacitor in the second integrating circuit 1*b*. The diodes 12 and 22 in FIGS. 2 and 3 respectively are inserted to provide voltage drops so that the transistor 10 and 20 may be cut off when the signals at the input terminals 16, 26 and 27 change to "0".

As described above, the output of the second NAND circuit may be applied to the lamp actuating circuit 1 so that the lamp 1' is turned on and off intermittently with on and off of the rectangular waves shown in FIG. 4*e*.

Figure 5:
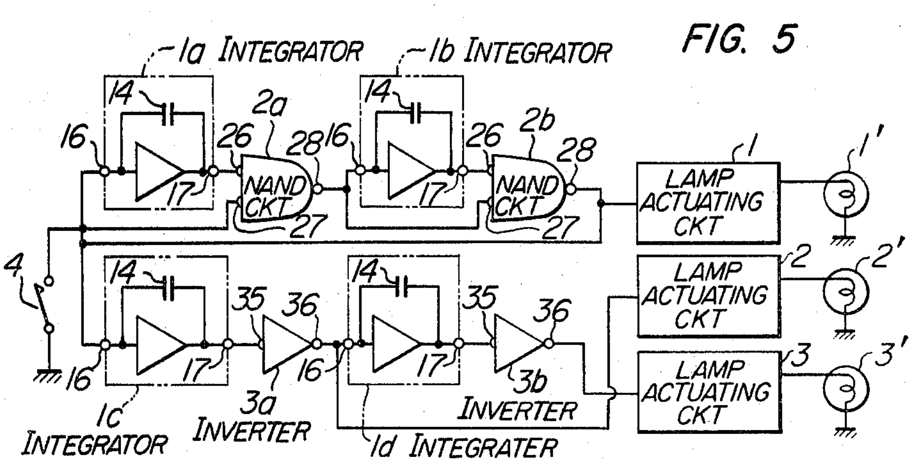
FIG. 5 is a block diagram showing the construction of another embodiment of the present invention.

Next, another embodiment of the present invention as applied to a sequential flashing type direction indicator will be explained. FIG. 5 is a block diagram illustrating the construction of this embodiment in which first and second integrating circuits 1*a* and 1*b*, first and second logical circuits 2*a* and 2*b*, a lamp actuating circuit 1 and a lamp 1' are identical with the corresponding parts in FIG. 1. Added to these component parts are third and fourth integrating circuits 1*c* and 1*d*, first and second inverter circuits 3*a* and 3*b*, lamp actuating circuits 2 and 3 and lamps 2' and 3'. The lamps 2' and 3' are mounted on one side of the rear of the vehicle in a row with the lamp 1' so that the lamps 1', 2' and 3' are located outwardly in this order with the lamp 1' being inner-most. An output terminal 28 of the second NAND circuit 2*b* is connected to an input terminal 16 of the third integrating circuit 1*c* whose output terminal 17 is connected to an input terminal 35 of the first inverter circuit 3*a*. An output terminal 36 of the first inverter circuit 3*a* is connected to an input terminal 16 of the fourth integrating circuit 1d whose output terminal 17 is connected to an input terminal 35 of the second inverter circuit 3*b*. The output terminals of the first and second inverter circuits 3*a* and 3*b* are connected to the lamp actuating circuits 2 and 3.

The first and second integrating circuits and the first and second logical circuits are identical in construction with those which are shown in FIGS. 2 and 3, respectively.

Figure 6:
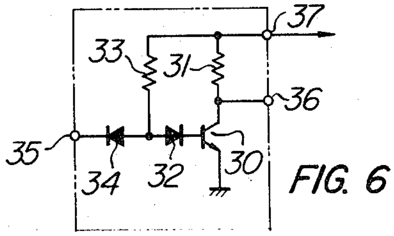
FIG. 6 is an electrical wiring diagram of an inverter circuit.

The first and second inverter circuits 3*a* and 3*b* are constructed as shown in FIG. 6 in which numeral 30 designates a transistor which has its emitter connected to the ground and its collector connected to a power supply terminal 37 through a resistor 31. The base of the transistor 30 is connected to the cathode of a diode 32 and one end of a resistor 33 and the anode of a diode 34 are connected to the common anode of the diode 32. The other end of the resistor 33 is connected to a power supply terminal 37 and the cathode of the diode 34 is connected to the input terminal 35. The collector of the transistor 30 is connected to the output terminal 36. The power supply terminal 37 is connected to a DC power supply circuit (not shown) so that a voltage of 6 volts is applied thereto.

With the construction described above, the operation of the first and second inverter circuits 3*a* and 3*b* will now be explained generally. When a voltage of 0 to 0.9 volts, that is, a "0" signal is applied to the input terminal 35, the transistor 30 is cut off to produce a "1" signal at the output terminal 36, while the application of a voltage larger than 0.9 volts, that is, "1" signal to the input terminal 35 conducts the transistor 30 to produce a "0" signal at the output terminal 36. The diode 32 is inserted to provide a voltage drop so that the transistor 30 is cut off when a "0" signal is applied to the input terminal 35. The transistor 30 also performs amplification and rectifying functions.

Figure 7A:
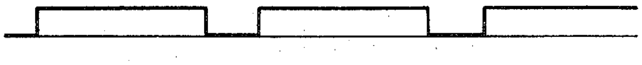
FIGS. 7*a*, 7*b*, 7*c*, 7*d* and 7*e* are diagrams showing the input and output waveforms generated at various points in the embodiments of FIG. 5.
Figures 7B, 7C:
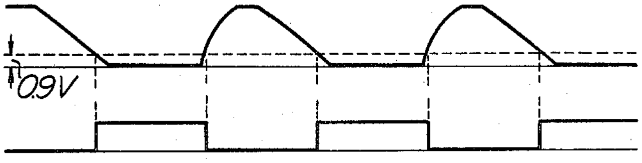
Figures 7D, 7E:
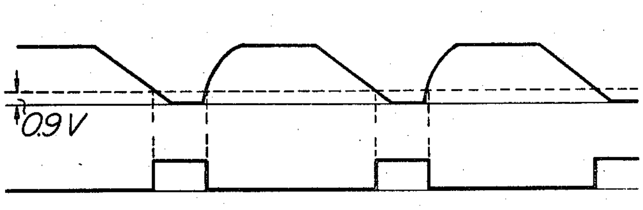
Figure 8A:
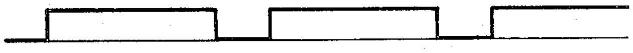
FIGS. 8*a*, 8*b* and 8*c* are diagrams showing the waveforms representative of the flashes of the lamps.
Figure 8B:
Figure 8C:

As previously explained with reference to the circuit shown in FIG. 1, the rectangular wave signal as shown in FIG. 4*e* is produced at the output terminal of the second NAND circuit 2*b*. This rectangular wave signal is reproduced in FIG. 7*a* and its frequency is of the order of 70 cycles per minute. When the rectangular wave shown in FIG. 7*a* is applied to the third integrating circuit 1*c*, an output signal whose voltage waveform is shown in FIG. 7*b* is produced at its output terminal by virtue of the integrating action as previously explained. This output signal is then applied to the first inverter circuit 3*a* so that an output signal is produced whose voltage waveform has been changed as shown in FIG. 7*c* with a reversal in phase. Then, as the signal shown in FIG. 7*c* is applied to the fourth integrating circuit 1*d*, this integrator operates in the similar manner as the third integrating circuit 1*c* to produce at the output terminal thereof an output signal whose voltage waveform is shown in FIG. 7*d*. This output signal is then applied to the second inverter circuit 3*b* so that an output signal is produced which is opposite in phase and whose voltage waveform has been changed as shown in FIG. 7*e*. Thus three signals are obtained as shown in FIGS. 7*a*, 7*c* and 7*e* which are then applied to the lamp actuating circuits 1, 2 and 3, respectively, so that the lamps 1′, 2′ and 3′ are turned on and off intermittently as shown in FIGS. 8*a*, 8*b* and 8*c*. In each of FIGS. 8*a*, 8*b* and 8*c*, the abscissa represents the time t and the ordinates in these figures represent the flashing conditions of the lamps 1′, 2′ and 3′, respectively, with the raised portions representing the lighting and the recessed portions representing the extinction of the lamps. The phase relations of the lamp actuating circuits 1, 2 and 3 are such that the lamps 1′, 2′ and 3′ will be lit when "1" signals are applied to the inputs of the lamp actuating circuits 1, 2 and 3, while the lamps 1′, 2′ and 3′ will be extinguished when "0" signals are applied to the inputs of the lamp actuating circuits 1, 2 and 3. As will be apparent from the waveforms shown in FIGS. 7*a* to 7*e* and FIGS. 8*a* to 8*c*, when the switch 4 is open, the lamps are flashed on and off in cycles and during each cycle thereof the innermost lamp 1′, the next lamp 2′ and the outermost lamp 3′ are sequentially lit in this order and then all the lamps are simultaneously extinguished.

While a preferred embodiment of the present invention has been described in which the lamps 1′, 2′ and 3′ are mounted in a row on one side of the rear of the vehicle, it is possible to construct a flasher type direction indicator in which lamps 1′, 2′ and 3′ are similarly mounted in a row on the other side of the rear of the vehicle and a direction signal switching circuit is provided at the rear of the signal generator of the present invention, whereby the direction signal switching circuit is actuated to signal a left or right turn so that the corresponding lamps 1′, 2′ and 3′ are sequentially lit and then extinguished with the innermost lamp being the first and the outermost one being the last to be lit.

Figure 9:
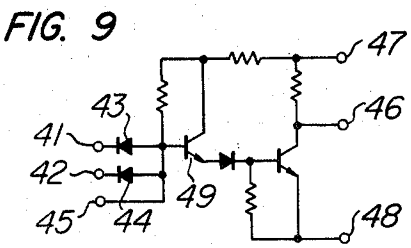
FIG. 9 is an equivalent electrical wiring diagram of a commercially available NAND circuit with an expander terminal comprising an integrated circuit.

Now considering the integrating circuit shown in FIG. 2, the NAND circuit in FIG. 3 and the inverter circuit in FIG. 6, it can be seen that the integrating circuit shown in FIG. 2 will coincide with the NAND circuit of FIG. 3 if the capacitor 14 is removed and an additional diode equivalent to the diode 15 is inserted in such a manner that the anode of this additional diode is connected to the anode of the diode 12 and its cathode serves as an input terminal, while the integrating circuit shown in FIG. 2 will coincide with the inverter circuit of FIG. 6 if the capacitor 14 is eliminated. Therefore, these circuits can be provided solely with commercially available IC NAND circuits with an expander terminal such as is shown in FIG. 9. In FIG. 9, numerals 41 and 42 designate NAND circuit input terminals connected to diodes 43 and 44, 45 an expander terminal, 46 an output terminal, 47 a power supply terminal, 48 a grounding terminal, and 49 a switching transistor. Thus, when the input terminal 41 is employed the circuit becomes an inverter circuit, when the input terminals 41 and 42 are employed the circuit becomes a NAND circuit, while it may be turned into an integrating circuit by inserting a capacitor between the expander terminal 45 and the output terminal 46 (if necessary, a resistor may be connected in series with the capacitor). It is now evident that the signal generator according to the present invention may be readily constructed by assemblying commercially available NAND circuits incorporating integrating integrated circuits (IC).

It should also be noted that a similar operation may be performed even if the first and second NAND circuits 2*a* and 2*b* in the embodiments as described above are replaced with AND circuits.

We claim

1. A signal generator for a flasher type direction indicator comprising a first integrating circuit, a first logical circuit for generating an output signal when both the input and output signals of said first integrating circuit are applied thereto, a second integrating circuit, and a second logical circuit for generating an output signal when both the input and output signal of said second integrating circuit are applied thereto, the input terminal of said second integrating circuit and the input terminal of said second logical circuit having a common connection to the output terminal of said first logical circuit, and the input terminal of said first integrating circuit and the input terminal of said first logical circuit having a common connection to the output terminal of said second logical circuit, whereby a light is flashed on and off with the output signals from said second logical circuit.

2. A signal generator for a flasher type direction indicator as set forth in claim 1, wherein each of said first and second integrating circuits comprises a transistor adapted to be conductive when an input signal is applied thereto, and a capacitor adapted to be discharged upon conduction of said transistor.

3. A signal generator for a flasher type direction indicator as set forth in claim 1, wherein each of said first and second integrating circuits comprises a NAND circuit consisting of an IC element with an expander terminal, said NAND circuit having inserted between said expander terminal and the output terminal thereof a circuit including a capacitor.

4. A signal generator for a flasher type direction indicator as set forth in claim 3, wherein each of said first and second logical circuits comprises a NAND circuit.

5. A signal generator for a flasher type direction indicator comprising first, second, third and fourth integrating circuits, a first logical circuit for generating an output signal when both the input and output signals of said first integrating circuit are applied thereto, a second logical circuit for generating an output signal when both the input and output signals of said second integrating circuit are applied thereto, and first and second inverter circuits for respectively changing the waveshapes of the output signals of said third and fourth integrating circuits with a reveral in phase, the input terminal of said second integrating circuit and the input terminal of said second logical circuit having a common connection to the output terminal of said first logical circuit, the input terminals of said first and third integrating circuits and the input terminal of said first logical circuit having a common connection to the output terminal of said second logical circuit, the output terminal of said first inverter circuit being connected to the input terminal of said fourth integrating circuit, whereby three light sources are flashed on and off at the same periods but with different flashing ratios with the three output signals from said second logical circuit, and said first and second inverter circuits.

6. A signal generator for a flasher type direction indicator as set forth in claim 5, wherein each of said first, second, third and fourth integrating circuits comprises a transistor adapted to be conductive when an input signal is applied thereto, and a capacitor adapted to be discharged upon conduction of said transistor.

7. A signal generator for a flasher type direction indicator as set forth in claim 5, wherein each of said first, second, third and fourth integrating circuits comprises a NAND circuit consisting of an IC element having an expander terminal, said NAND circuit having inserted between said expander terminal and the output terminal thereof a circuit including a capacitor.

8. A signal generator for a flasher type direction indicator as set forth in claim 7, wherein each of said first and second logical circuits and said first and second inverter circuit comprises a NAND circuit consisting of an IC element.

* * * * *